No. 752,673. Patented February 23, 1904.

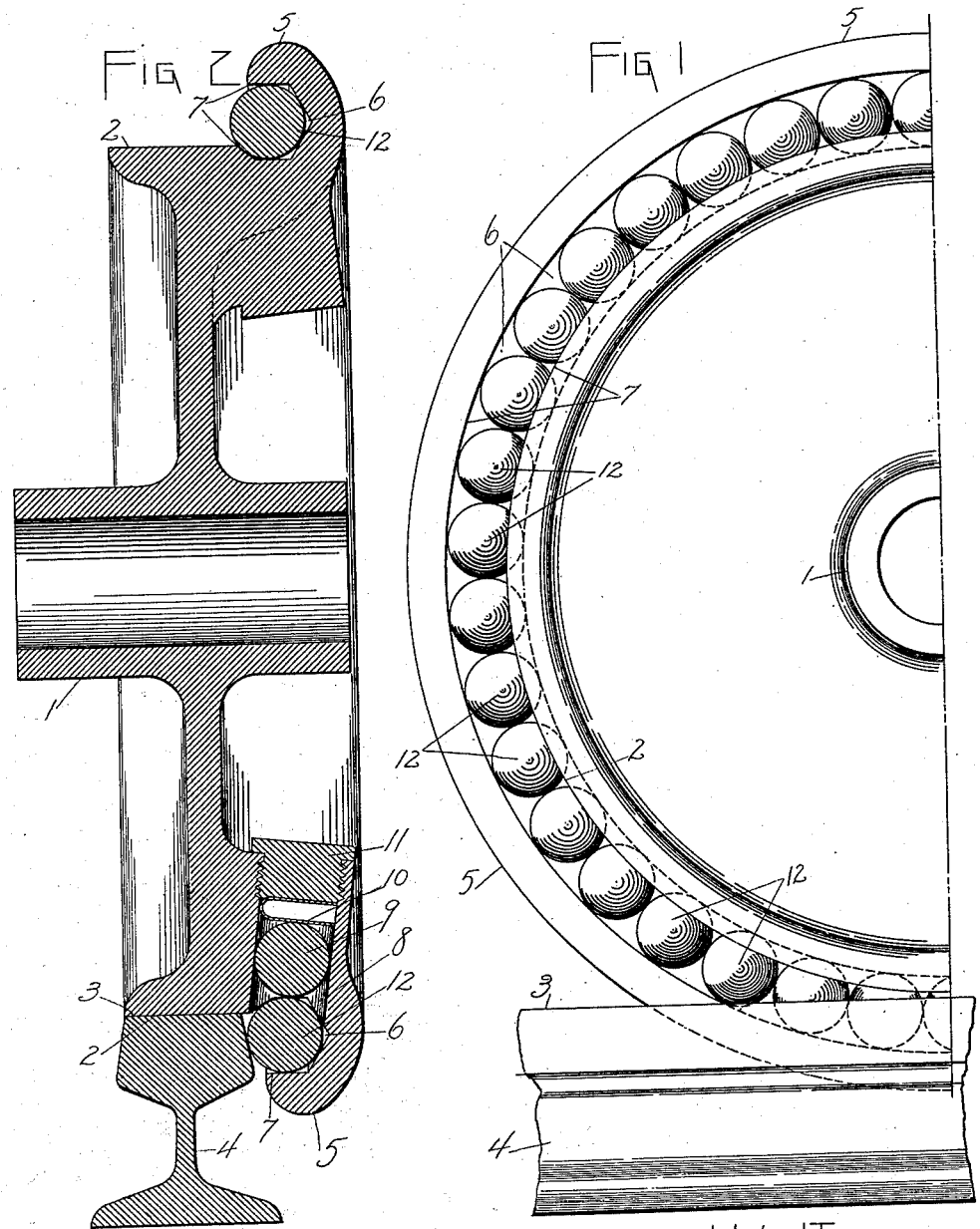

UNITED STATES PATENT OFFICE.

LEVI HAYNE, OF SCHENECTADY, NEW YORK.

CAR-WHEEL.

SPECIFICATION forming part of Letters Patent No. 752,673, dated February 23, 1904.

Application filed July 29, 1903. Serial No. 167,390. (No model.)

*To all whom it may concern:*

Be it known that I, LEVI HAYNE, a citizen of the United States, residing at Schenectady, county of Schenectady, and State of New York, have invented certain new and useful Improvements in Car-Wheels, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in both figures.

Figure 1 of the drawings is a view in side elevation of a broken-away section of a railway-rail and half of a car-wheel embodying this invention in engagement therewith. Fig. 2 is a central vertical longitudinal section of the same.

The object of this invention is to eliminate friction due to the engagement with the side of a railway-rail of the flange of a wheel adapted to travel upon said rail. To this end in carrying out the present invention the flanged rail-engaging wheel is provided with a series of antifriction-balls disposed about its periphery at the junction of its flange and tread adapted to engage and roll upon the side surface of the rail, such engagement serving the purpose of the flange to prevent the wheel from leaving the rail without sliding friction, which occurs between the rail and the flanges of car-wheels as now commonly constructed.

Referring to the drawings, 1 represents the hub of the wheel, having the tread 2, adapted to bear upon the tread 3 of the rail 4, which may be any known type of railway-rail. The wheel has a peripheral flange 5 and has within its flanged portion an annular ball-runway 6, provided with a contracted opening or slot 7 on the periphery of the wheel along the junction of its tread and flange. This ball-runway contains a series of antifriction-balls 7, which are exposed through said opening and are adapted to contact therethrough with the side surface of the head of the rail, as shown in Fig. 2. The thrust of the flange upon the side of the rail is thus accomplished by rolling friction instead of by sliding friction, as in the flanged rail-engaging wheels heretofore commonly in use. The wear upon the side of the rail and portion of the wheel which engages said side of the rail is thus reduced. The force required to propel the wheel is also lessened, particularly where the wheel-engaged rail is sharply curved to present a concaved side surface to the flange of the wheel. The antifriction-balls also prevent the flange of the wheel from rising upon and running over the rail, thereby reducing the danger of the wheel leaving the rail. The escape of the balls from the runway is prevented by the contracted form of the slotted opening 7. The balls may be inserted and retained in the runway in any known manner.

In Fig. 2 an aperture 8 is shown extending inwardly from the ball-runway through the flange, permitting the insertion and removal of the balls therethrough. As a means for preventing the escape of the balls through said opening retaining mechanism is shown in the form of a ball 9, adapted to be yieldingly held against the balls in the runway by the U-shaped spring 10, interposed between said ball 9 and the screw 11, inserted in said aperture.

This invention is applicable to various styles of flanged rail-engaging wheels and is particularly adapted for the wheels of railway-cars of various kinds.

What I claim as new, and desire to secure by Letters Patent, is—

1. A flanged rail-engaging wheel having a series of antifriction-balls disposed about its periphery at the junction of its flange and tread.

2. The combination with a flanged rail-engaging wheel provided with an annular ball-runway having a contracted slotted opening on the periphery of the wheel along the junction of its tread and flange, of a series of balls located in said runway adapted to contact with the side of the rail through said contracted slotted opening.

3. The combination with a flanged rail-engaging wheel provided with an annular ball-runway having a contracted slotted opening on the periphery of the wheel along the junction of its tread and flange, and an aperture extending from said runway inwardly through said flange; of a series of balls in said runway insertible and removable through said aperture; and means for closing said aperture.

4. The combination with a flanged rail-engaging wheel provided with an annular ball-runway having a contracted slotted opening on the periphery of the wheel along the junction of its tread and flange, and an aperture extending from said runway inwardly through said flange; of a series of balls in said runway insertible and removable through said aperture; a retaining-ball in said aperture engageable with the balls in said runway; a screw inserted in said aperture; and a spring interposed between said screw and said retaining-ball.

In testimony whereof I have hereunto set my hand this 27th day of July, 1903.

LEVI HAYNE.

Witnesses:
LOUIS TRUDEAU,
WM. H. RYAN.